United States Patent
Zhou et al.

(10) Patent No.: US 10,636,141 B2
(45) Date of Patent: Apr. 28, 2020

(54) ADVERSARIAL AND DUAL INVERSE DEEP LEARNING NETWORKS FOR MEDICAL IMAGE ANALYSIS

(71) Applicant: Siemens Healthcare GmbH, Erlangen (DE)

(72) Inventors: Shaohua Kevin Zhou, Plainsboro, NJ (US); Mingqing Chen, Plainsboro, NJ (US); Daguang Xu, Princeton, NJ (US); Zhoubing Xu, Plainsboro, NJ (US); Dong Yang, Somerset, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 93 days.

(21) Appl. No.: 15/868,062

(22) Filed: Jan. 11, 2018

(65) Prior Publication Data

US 2018/0225823 A1    Aug. 9, 2018

Related U.S. Application Data

(60) Provisional application No. 62/457,013, filed on Feb. 9, 2017.

(51) Int. Cl.
*G06K 9/00* (2006.01)
*G06T 7/00* (2017.01)
(Continued)

(52) U.S. Cl.
CPC .......... *G06T 7/0012* (2013.01); *G06K 9/6267* (2013.01); *G06K 9/66* (2013.01); *G06N 3/0454* (2013.01); *G06N 3/084* (2013.01); *G06N 7/005* (2013.01); *G06T 7/11* (2017.01);
*G06K 2209/05* (2013.01); *G06T 2207/10072* (2013.01); *G06T 2207/10081* (2013.01); *G06T 2207/10088* (2013.01); *G06T 2207/10104* (2013.01); *G06T 2207/10116* (2013.01);
(Continued)

(58) Field of Classification Search
CPC  G06T 2207/20081; G06T 2207/20084; G06K 9/6267; G06K 2209/05; G06K 9/66; G06N 3/0454
See application file for complete search history.

(56) References Cited

U.S. PATENT DOCUMENTS 9,275,308 B2    3/2016   Szegedy et al.
9,373,059 B1    6/2016   Heifets et al.
(Continued)

OTHER PUBLICATIONS

Makhzani, Alireza, et al. "Adversarial autoencoders." arXiv preprint arXiv:1511.05644 (2015) (Year: 2015).*
(Continued)

*Primary Examiner* — Li Liu

(57) ABSTRACT

Methods and apparatus for automated medical image analysis using deep learning networks are disclosed. In a method of automatically performing a medical image analysis task on a medical image of a patient, a medical image of a patient is received. The medical image is input to a trained deep neural network. An output model that provides a result of a target medical image analysis task on the input medical image is automatically estimated using the trained deep neural network. The trained deep neural network is trained in one of a discriminative adversarial network or a deep image-to-image dual inverse network.

15 Claims, 9 Drawing Sheets

(51) Int. Cl.
  *G06K 9/66* (2006.01)
  *G06T 7/11* (2017.01)
  *G06N 7/00* (2006.01)
  *G06N 3/04* (2006.01)
  *G06K 9/62* (2006.01)
  *G06N 3/08* (2006.01)

(52) U.S. Cl.
  CPC .............. *G06T 2207/10132* (2013.01); *G06T 2207/20081* (2013.01); *G06T 2207/20084* (2013.01)

(56) References Cited

U.S. PATENT DOCUMENTS

| | | | |
|---|---|---|---|
| 9,760,807 | B2 | 9/2017 | Zhou et al. |
| 2015/0170002 | A1 | 6/2015 | Szegedy et al. |
| 2015/0238148 | A1 | 8/2015 | Georgescu et al. |
| 2016/0063359 | A1 | 3/2016 | Szegedy et al. |
| 2016/0093048 | A1 | 3/2016 | Cheng et al. |
| 2016/0140424 | A1 | 5/2016 | Wang et al. |
| 2016/0174902 | A1 | 6/2016 | Georgescu et al. |
| 2016/0180195 | A1 | 6/2016 | Martinson et al. |
| 2016/0210749 | A1 | 7/2016 | Nguyen et al. |
| 2016/0328643 | A1 | 11/2016 | Liu et al. |
| 2017/0200067 | A1 | 7/2017 | Zhou et al. |
| 2017/0277981 | A1 | 9/2017 | Zhou et al. |
| 2017/0316286 | A1 | 11/2017 | Szegedy et al. |
| 2018/0075581 | A1* | 3/2018 | Shi ........................ G06T 3/4053 |
| 2018/0174049 | A1* | 6/2018 | Pauly ................... G06K 9/6256 |
| 2018/0211164 | A1* | 7/2018 | Bazrafkan .............. G06N 3/088 |

OTHER PUBLICATIONS

Liu, Ming-Yu, and Oncel Tuzel. "Coupled generative adversarial networks." Advances in neural information processing systems. 2016. (Year: 2016).*

Springenberg, Jost Tobias. "Unsupervised and semi-supervised learning with categorical generative adversarial networks." arXiv preprint arXiv:1511.06390 (2015). (Year: 2015).*

Goodfellow et al., "Generative Adversarial Nets"; Universite of Montreal, Montreal, QC; Jun. 10, 2014; pp. 1-9.

* cited by examiner

ADVERSARIAL AND DUAL INVERSE DEEP LEARNING NETWORKS FOR MEDICAL IMAGE ANALYSIS

This application claims the benefit of U.S. Provisional Application No. 62/457,013, filed Feb. 9, 2017, the disclosure of which is herein incorporated by reference.

BACKGROUND OF THE INVENTION

The present invention relates to automated analysis of medical images, and more particularly, to automating medical image analysis tasks using deep learning networks.

Medical image analysis involves solving important tasks such as landmark detection, anatomy detection, anatomy segmentation, lesion detection, segmentation and characterization, cross-modality image registration, image denoising, cross-domain image synthesis, etc. Computer-based automation of these medical image analysis tasks brings significant benefits to medical imaging. For example, one such benefit of automating medical image analysis tasks is that it allows structured image reading and reporting for a streamlined workflow, thereby improving image reading outcomes in terms of accuracy, reproducibility, and efficiency. Other benefits of automatic medical image analysis tasks include enabling personalized scanning at a reduced radiation dose, saving examination time and cost, and increasing consistency and reproducibility of the examination.

Currently the technical approaches for various medical image analysis tasks are task-dependent. In other words, for each task among landmark detection, anatomy detection, anatomy segmentation, lesion detection, segmentation and characterization, cross modality image registration, image denoising, cross-domain image synthesis, etc., there are a multitude of technical approaches crafted for such a task. Consequently, the approaches for solving the same task are very diverse in nature. There is no systematic, universal approach to address all of these medical image analysis tasks.

BRIEF SUMMARY OF THE INVENTION

The present invention provides methods and systems for computer-based automatic medical image analysis using deep learning networks. Embodiments of the present invention provide various methods for training deep learning networks for automatic medical image analysis. Embodiments of the present invention utilize a discriminative adversarial network for automated medical image analysis. Other embodiments of the present invention utilize dual inverse network learning to train a deep image-to-image network (DI2IN) for performing medical image analysis tasks.

In an embodiment of the present invention, a medical image of a patient is received. The medical image is input to a trained deep neural network. An output model that provides a result of a target medical image analysis task on the input medical image is automatically estimated using the trained deep neural network, wherein the trained deep neural network is trained in one of a discriminative adversarial network or a deep image-to-image dual inverse network.

In one embodiment, the trained deep neural network is an estimator network that directly maps the output model from the input medical image and is trained in the discriminative adversarial network, which includes the estimator network and a discriminator network that distinguishes between estimated output models estimated by the estimator network from input training images and real ground-truth output models, conditioned on the input training images.

In another embodiment, the trained deep neural network is a first deep image-to-image network trained in the deep image-to-image dual inverse network, which includes the first deep image-to-image network trained to perform the target medical image analysis task and a second deep image-to-image network trained to perform an inverse task to the target medical image analysis task. The output model is automatically estimated by automatically generating an output image that provides a result of the target medical image analysis task on the input medical image using the first deep image-to-image network.

These and other advantages of the invention will be apparent to those of ordinary skill in the art by reference to the following detailed description and the accompanying drawings.

DETAILED DESCRIPTION

Figure 1:
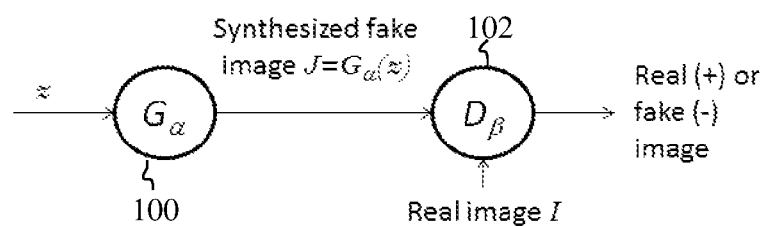
FIG. 1 illustrates a generative adversarial network for image generation.

The present invention relates to methods and systems for automated computer-based medical image analysis using deep learning networks. Embodiments of the present invention are described herein to give a visual understanding of the method for automated detection and classification of prostate tumors. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system.

Accordingly, is to be understood that embodiments of the present invention may be performed within a computer system using data stored within the computer system.

Embodiments of the present invention train deep neural networks for performing automated medical image analysis tasks, such as such as landmark detection, anatomy detection, anatomy segmentation, lesion detection, segmentation and characterization, cross-modality image registration, image denoising, cross-domain image synthesis, etc. Once a deep neural network is trained for a particular medical image analysis task in a training stage based training data with known ground truth outputs, the deep neural network is then used in an online inference stage to automatically generate an output result of the medical image analysis task for a newly received medical image of a patient. In one embodiment of the present invention, a deep neural network for medical image analysis is trained using a discriminative adversarial network. In another embodiment of the present invention, a deep neural network for medical image analysis is trained using deep image-to-image dual inverse network learning.

Discriminative Adversarial Network

Many medical image analysis problems are formulated as model estimation: given a medical image I(x), the analysis task is estimate a model $\theta$ associated with such an image. For example, landmark detection aims to detect the pixel or voxel location(s) $\theta$ at which the landmark is located. Image segmentation aims to yield a mask image $\theta=m(x)$ whose value is 1 for pixels/voxels inside the boundary of the segmented target object and 0 for pixels/voxels outside of the boundary of the segmented target object. Image registration takes a pair of images as input and outputs registration parameters (e.g., affine) or a nonparametric deformation field. Most model estimation algorithms optimize a certain cost function $C(\theta|I)$. The choice of the cost function is important and directly relates to the estimated model. Embodiments of the present invention provide a new way of defining a cost function and learning parameters of a deep neural network to optimize the cost function that lead to a more effective model estimate for medical image analysis tasks.

A conditional random field (CRF) is a modeling tool that is used in image recognition and segmentation. Given an input image I, a CRF estimates a model $\theta$ that minimizes the following cost function:

$$\min_\theta C(\theta|I) = -\log(L(\theta|I)) - \log(prior(\theta|I)), \quad (1)$$

where $L(\theta|I)$ is the likelihood function and $prior(\theta|I)$ is the prior probability that is also conditioned on I. Taking segmentation for example, the model $\theta$ is represented by a mask image $\theta=M(x)=\{m(x)\}$. With proper assumptions, the cost function is reduced to:

$$\min_M C(M|I) = \Sigma U(m(x)|I) + \Sigma V(m(x),m(y)|I), \quad (2)$$

where $U(m(x)|I)$ is the unary pixel-wise likelihood function and $V(m(x),m(y)|I)$ is a pairwise function conditioned on the image I and based on a neighborhood graph.

A family of model estimation tasks can be formulated within a deep image-to-image network (DI2IN) learning framework, which is fully convolutional. In a DI2IN, the input is an image (or multiple images) and the output is also an image of the same grid size that represents the result of the target medical image analysis task. This framework can be applied to perform many medical image analysis tasks. For example, for landmark detection, an image with a Gaussian blob around the target landmark can be used to represent a landmark. For image segmentation, the mask image is already in the image representation format. Medical image analysis tasks such as detection, segmentation, registration, denoising, and cross-modality synthesis can be formulated in a DI2IN framework.

A generative adversarial network (GAN) is a new paradigm for image generation. FIG. 1 illustrates a generative adversarial network for image generation. As shown in FIG. 1, the GAN includes two modules in the form of deep networks: a generator (or G-network) $G_\alpha$ 100 for image generation and a discriminator (or D-network) $D_\beta$ 102 for distinguishing between a real image and a synthesized image. The generator $G_\alpha$ 100 generates a synthesized image $J=G_\alpha(z)$ from some input z. The discriminator $D_\beta$ 102 inputs the synthesized image $J=G_\alpha(z)$ generated by the generator $G_\alpha$ 100 and a real image I and classifies one image as real and the other image as fake (synthesized). During training, the generator $G_\alpha$ 100 and the discriminator $D_\beta$ 102 together play the following minimax game:

$$\min_\alpha \max_\beta E_{I\sim p(I)}[\log(D_\beta(I))] + E_{z\sim p(z)}[\log(1-D_\beta(J=G_\alpha(z)))], \quad (3)$$

where $\alpha$ and $\beta$ are the parameters (weights) of the generator $G_\alpha$ 100 and discriminator $D_\beta$ 102, respectively. The generator $G_\alpha$ 100 and the discriminator $D_\beta$ 102 evolve dynamically in the sense of learning better network parameters, as long as the game is on until they reach equilibrium; that is, the synthesized image $I=G_\alpha(z)$ becomes indistinguishable (or a close to indistinguishable as possible) from the real image through the eye of the discriminator $D_\beta$ 102. Under such circumstances, the generator essentially generates a real image. The GAN framework enables rapid progress in synthesizing real images, but has not been applied to model estimation.

Figure 2:
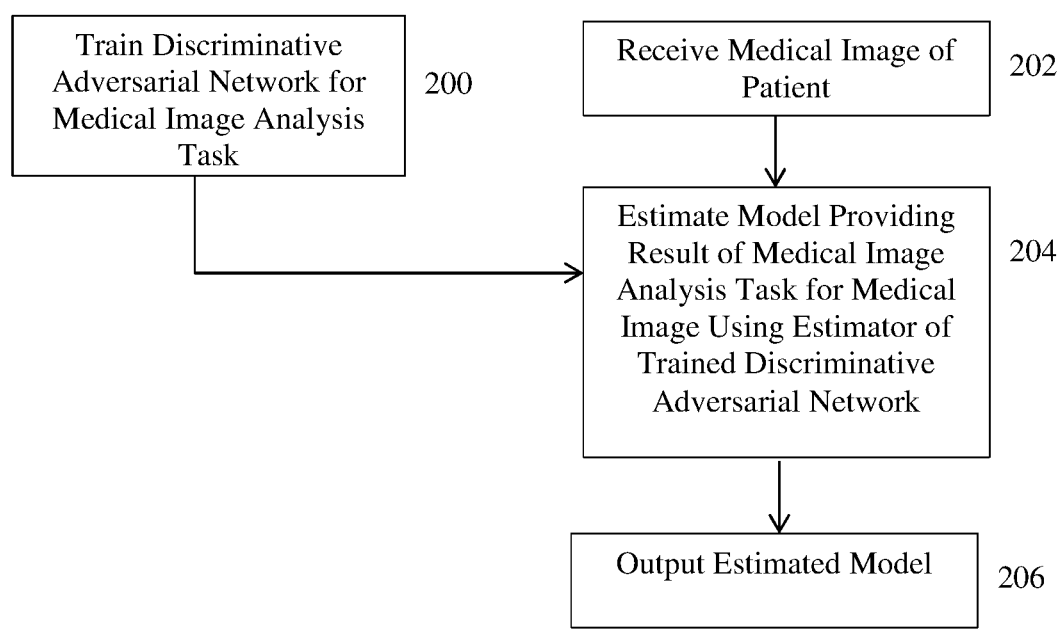
FIG. 2 illustrates a method for performing a target medical image analysis task using a discriminative adversarial network according to an embodiment of the present invention.

According to an advantageous embodiment of the present invention, the present inventors have proposed a discriminative adversarial network (DAN) for model estimation for medical image analysis tasks. FIG. 2 illustrates a method for performing a target medical image analysis task using a discriminative adversarial network according to an embodiment of the present invention. The method of FIG. 2 includes a training stage (step 200) and an inference stage (steps 202-206). The training stage (step 200) is performed off-line to train a deep neural network for a particular medical image analysis task. The inference stage (steps 202-206) performs the medical image analysis task on a newly received medical image using the trained deep neural network resulting from the training stage. Once the deep neural network for a particular medical image analysis task is trained in the training stage, the inference stage can be repeated for each newly received medical image(s) to perform the medical image analysis task on each newly received input medical image(s) using the trained deep neural network.

Figure 3:
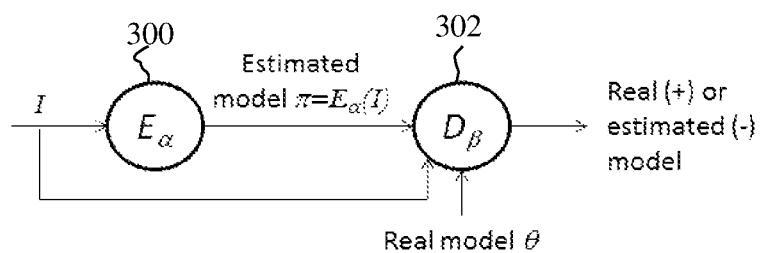
FIG. 3 illustrates a discriminative adversarial network for model estimation for medical image analysis according to an embodiment of the present invention.

Referring to FIG. 2, at step 200, a discriminative adversarial network (DAN) is trained for a target medical image analysis task. FIG. 3 illustrates a discriminative adversarial network for model estimation for medical image analysis according to an embodiment of the present invention. As shown in FIG. 3, the DAN includes two deep neural networks: an estimator (or E-network) $E_\alpha$ 300 for estimating a model and a discriminator (or D-network) $D_\beta$ 302 for distinguishing between a real model and an estimated model. The estimator $E_\alpha$ 300 is a deep neural network that inputs a medical image I and outputs an estimated model $\pi=E_\alpha(I)$ providing the estimated/predicted result of the target medical image analysis task. The estimator $E_\alpha$ 300 performs discriminative modeling, in that it directly maps the output model parameter $\pi=E_\alpha(I)$ from the input image I. Because the estimator $E_\alpha$ 300 performs discriminative modeling, the overall network (including the estimator $E_\alpha$ 300 and the discriminator $D_\beta$ 302) is referring to herein as a discriminative adversarial network. As shown in FIG. 3, the discriminator $D_\beta$ 302 is conditioned on the input image I. The discriminator $D_\beta$ 302 is a deep neural network that inputs the input image I, the estimated model $\pi=E_\alpha(I)$, and a real ground truth model $\theta$, and distinguishes between the estimated model $\pi$ and the real model $\theta$. In particular, for each estimated model $\pi$ and real model $\theta$ input to the discriminator $D_\beta$ 302, the discriminator $D_\beta$ 302 estimates a probability of that model being a real model, conditioned on the input image I.

During training, the estimator $E_\alpha$ 300 and the discriminator $D_\beta$ 302 together play the following minimax game, conditioned on the medical image I:

$$\min_\alpha \max_\beta E_{I,\theta \sim p(I,\theta)}[(D_\beta(\theta|I))] + E_{I,\theta \sim p(I,\theta)}[\log(1-D_\beta(\pi=E_\alpha(I)|I))], \quad (4)$$

where $\alpha$ and $\beta$ are the parameters (weights) of the estimator $E_\alpha$ 300 and the discriminator $D_\beta$ 302, respectively. The networks are trained end-to-end by iteratively adjusting the parameters (weights) $\alpha$ and $\beta$ to optimize Equation (4) for a set of training samples. In Equation (4), the first term is a cost related to the classification by the discriminator $D_\beta$ 302 of the real model $\theta$ and the second term is a cost related to the classification by the discriminator $D_\beta$ 302 of the estimated model $=E_\alpha(I)$. The estimator $E_\alpha$ 300 and the discriminator $D_\beta$ 302 evolve dynamically in the sense of learning better network parameters until they reach equilibrium, that is, the estimated model $\pi=E_\alpha(I)$ becomes indistinguishable (or as close to indistinguishable as possible) from the real model $\theta$ through the eyes of the discriminator $D_\beta$ 302.

Figure 4:
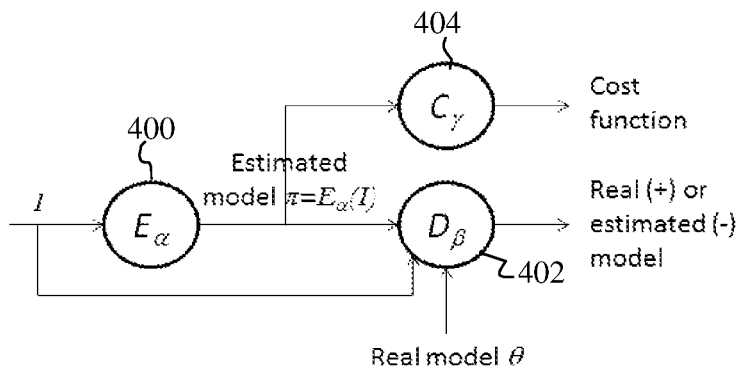
FIG. 4 illustrates a discriminative anatomical network coupled with another cost function according to an embodiment of the present invention.

According to an advantageous implementation, an additional cost function that measures a difference/error between the estimated output model and ground truth output model for each training sample can be integrated with the DAN during training. FIG. 4 illustrates a discriminative anatomical network coupled with another cost function according to an embodiment of the present invention. As shown in FIG. 4, the DAN includes two deep neural networks: the estimator $E_\alpha$ 400 for estimating a model $\pi=E_\alpha(I)$ providing the result of a target medial image analysis task for an input medical image I and the discriminator $D_\beta$ 402 for distinguishing between the estimated model $\pi=E_\alpha(I)$ generated by the estimator $E_\alpha$ 400 and a real ground truth model $\theta$, conditioned on the input image I. The estimator $E_\alpha$ 400 and the discriminator $D_\beta$ 402 of FIG. 4 are similar to the estimator $E_\alpha$ 300 and the discriminator $D_\beta$ 302 of FIG. 3. In addition to being input to the discriminator $D_\beta$ 402, the estimated model $\pi=E_\alpha(I)$ estimated by the estimator $E_\alpha$ 400 is also input to a cost function $C_\gamma$ 404 having parameters $\gamma$. The cost function $C_\gamma$ 404 compares the estimated model $\pi=E_\alpha(I)$ for a given input image I training sample with the ground-truth model $\theta$ for that input image I training sample and computes an error/distance between the estimated model $\pi$ and ground truth model $\theta$. The error/distance calculated by the cost function $C_\gamma$ 404 may depend on the output model for the target medical image analysis task. For example, if the target medical image analysis task is landmark detection and the output model is the location of one or more landmarks in the input medical image, the cost function $C_\gamma$ 404 may compute a distance measure between each estimated landmark location in the estimated model $\pi$ and the corresponding actual landmark location in the ground truth model $\theta$. In an exemplary implementation in which the output model is represented by an image (e.g., a segmentation mask for image segmentation or a deformation field for image registration), the cost function $C_\gamma$ 404 may computer a pixel-wise (or voxel-wise for 3D images) error/distance between the estimated model $\pi$ and the ground truth model $\theta$. For example, the cost function $C_\gamma$ 404 may be implemented using a regressive or logistic function.

During training, the parameters a of the estimator $E_\alpha$ 400 and the parameters $\beta$ of the discriminator $D_\beta$ 402 are learned to optimize the following minimax game, conditioned on the input medical image I:

$$\min_\alpha \max_\beta E_{I,\theta \sim p(I,\theta)}[C_\gamma(\theta, \pi=E_\alpha(I)|I)] + E_{I,\theta \sim p(I,\theta)}[\log(D_\beta(\theta|I))] + E_{I,\theta \sim p(I\theta)}[\log(1-D_\beta(\pi=E_\alpha(I)|I))]. \quad (5)$$

In Equation (5), the first term is a cost computed by the cost function $C_\gamma$ 404, the second term is a cost related to the classification of the real model $\theta$ by the discriminator $D_\beta$ 402, and the third term is a cost related to the classification of the estimated model $\pi=E_\alpha(I)$ by the discriminator $D_\beta$ 402. Given a set of N training pairs $\{(I_n, \theta_n)\}$, the task in training is to learn parameters $\alpha$ and $\beta$ that yield the optimal solution to the following minimax objective function in which the expectation value is replaced by the sample average over the set of training samples:

$$\min_\alpha \max_\beta \frac{1}{N} \sum_{n=1}^{N} [C_\gamma(\theta_n, \pi_n = E_\alpha(I_n) | I_n) + \log(D_\beta(\theta_n | I_n)) + \log(1 - D_\beta(\pi_n = E_\alpha(I_n) | I_n))]. \quad (6)$$

In the embodiment described herein using the minimax objective function in Equation (6), the parameters $\gamma$ of the cost function $C_\gamma$ 404 are preset and not adjusted in the training. In another possible implementation, depending of the formulation of the cost function $C_\gamma$ 404, the parameters $\gamma$ can also be adjusted together with the parameters $\alpha$ and $\beta$ during training to optimize the minimax objective function.

The parameters $\alpha$ and $\beta$ that optimize the minimax objective function in Equation (6) are learned by iteratively alternating the following two steps until the parameters $\alpha$ and $\beta$ converge (or until a preset maximum number of training iterations is reached):

Step 1—With the parameters $\alpha$ of the estimator $E_\alpha$ 400 fixed, solve the following maximization task for the parameters $\beta$ of the discriminator $D_\beta$ 402:

$$\max_\beta \frac{1}{N} \sum_{n=1}^{N} [\log(D_\beta(\theta_n | I_n)) + \log(1 - D_\beta(\pi_n = E_\alpha(I_n) | I_n))]. \quad (7)$$

The discriminator $D_\beta$ 402 calculates a probability that a given image is a real image. Accordingly, in this maximization task, parameters $\beta$ of the discriminator $D_\beta$ 402 are learned that increase/maximize the probability scores calculated for the real ground truth models $\theta_n$ by the $D_\beta$ 402 and decrease/minimize the probability scores calculated for the estimated models $\pi_n=E_\alpha(I_n)$ by the discriminator $D_\beta$ 402 over the set of training samples. Since, as described above, a deep neural network is used to model the discriminator $D_\beta$ 402, this maximization task can be performed using a backpropagation step implemented based on a mini-batch of training pairs.

Step 2—With the β of the discriminator $D_\beta$ 402 fixed, solve the following minimization task for the parameters α of the estimator $E_\alpha$ 400:

$$\min_\alpha \frac{1}{N} \sum_{n=1}^{N} [C_\gamma(\theta_n, \pi_n = E_\alpha(I_n) | I_n) + \log(1 - D_\beta(\pi_n = E_\alpha(I_n) | I_n))]. \quad (8)$$

It is practically found that, rather than training the estimator $E_\alpha$ 400 to minimize $\log(1-D_\beta(\pi))$, training the estimator $E_\alpha$ 400 to maximize $\log(D_\beta(\pi))$ leads to better gradient signals early in learning, even though both objective functions yield the same fixed point. Accordingly, in an advantageous implementation, the parameters α of the estimator $E_\alpha$ 400 can be learned in step 2 using the following minimization problem:

$$\min_\alpha \frac{1}{N} \sum_{n=1}^{N} [C_\gamma(\theta_n, \pi_n = E_\alpha(I_n) | I_n) - \log(D_\beta(\pi_n = E_\alpha(I_n) | I_n))]. \quad (9)$$

In this minimization problem, parameters a of the estimator $E_\alpha$ 400 are learned that minimize/decrease the error between the estimated models $\pi_n = E_\alpha(I_n)$ and the ground truth models $\theta_n$ and maximize/increase the probability scores calculated for the estimated models $\pi_n = E_\alpha(I_n)$ by the discriminator $D_\beta$ 402 over the set of training samples. Since, as described above, a deep neural network is used to model the estimator $E_\alpha$ 400, this minimization task can be performed using a back-propagation step implemented based on a minibatch of training pairs.

In an advantageous implementation, the estimator of the DAN can be implemented as a DI2IN. The DI2IN can have a deep convolutional encoder-decoder network architecture. The encoder of the DI2IN has a series of layers that code the input image into a code whose size is substantially less than the size of the input image. The decoder of the DI2IN has a series of layers that will then decode the code into the output model, which in the case of a DI2IN will be represented by an output image. All the intermediate information generated in the encoder is shared with the decoder, so that no information is lost in the encoding process. When the estimator is a fully convolutional deep neural network, such as a DI2IN, then the whole DAN becomes a large fully convolutional network as all intermediate layers are in the form of images. This allows seamless reuse of existing fully convolutional implementations for computational efficiency and learning efficiency and makes DI2IN trained in a DAN a competitive choice for performing medical image analysis tasks.

Figure 5:
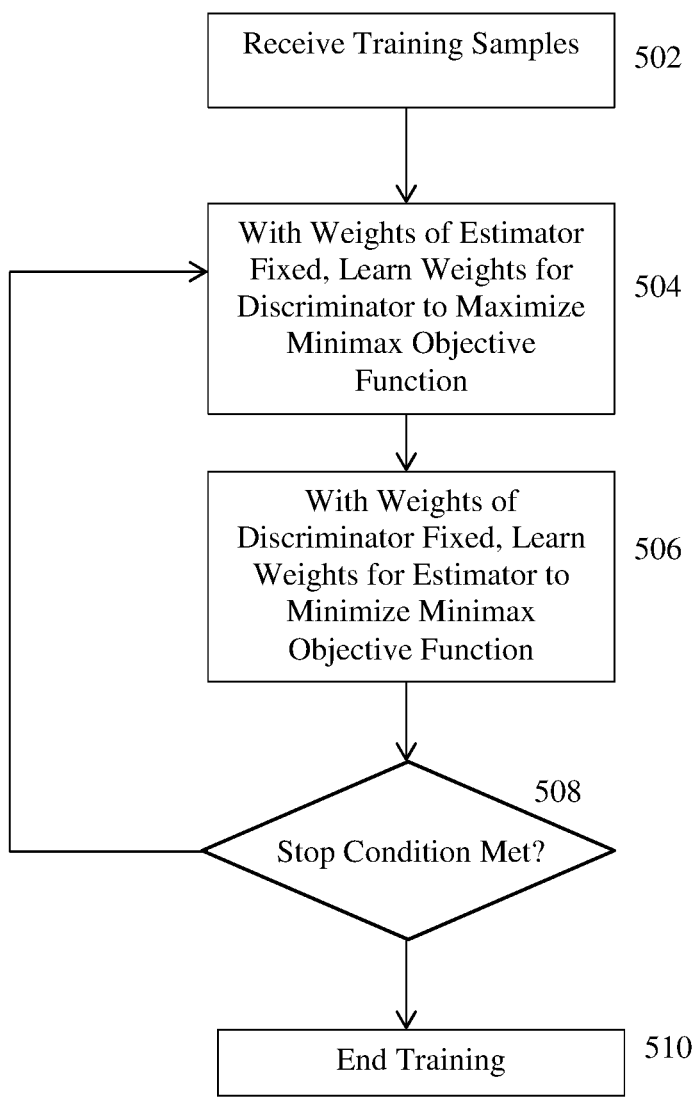
FIG. 5 illustrates a method of training a discriminative adversarial network for medical image analysis according to an embodiment of the present invention.

FIG. 5 illustrates a method of training a discriminative adversarial network for medical image analysis according to an embodiment of the present invention. At step 502, training samples are received. The training samples include a set of N training pairs $\{(I_n, \theta_n)\}$. Each training pair includes an input medical image $I_n$ (or multiple input medical images, e.g., if the target medical image analysis task is registration) and a corresponding ground truth output model $\theta_n$ that provides the results of the target medical image analysis task for the input medical image $I_n$.

For the medical image analysis task of landmark detection, the ground truth model $\theta_n$ can be the pixel/voxel location of a target landmark in the corresponding input image $I_n$ (or pixel/voxel locations for a set of target landmarks). For anatomical object (e.g., organ) detection, the output model θ can be a bounding box that surrounds the target anatomical object. For example, for an axis-aligned box, $\theta=[x_c, s]$, where $x_c$ is the center of the box and s is the size of the box. For a non-axis-aligned box, θ can include position, orientation, and scale parameters. For some medical imaging analysis tasks, such as image segmentation, image registration, image denoising, and cross-modality image synthesis, the output model θ may be represented by an image. For example, the output model θ for an image segmentation task can be a mask image whose value is 1 inside the segmented object boundary and 0 outside the segmented object boundary. For image registration, the output model θ can be registration parameters (e.g., affine) or a nonparametric deformation field. In cases in which the output model θ is an image, the estimator of the DAN can be implemented as a DI2IN.

The input training images are medical images acquired using any type of medical imaging modality, such as computed tomography (CT), magnetic resonance (MR), DynaCT, ultrasound, x-ray, positron emission tomography (PET), etc., depending on the target medical image analysis task for which the DAN is to be trained. The input training images can be received by loading a number of previously stored medical images from a database of medical images. The ground truth output models corresponding to the input training images can be received by loading previously stored ground truth output models from a database, or by generating ground truth output models for the target medical image analysis task from the input training images, for example by manual annotation, or existing automated or semi-automated medical image analysis techniques.

Steps 504-508 of the FIG. 5 iteratively update weights of the estimator network and the discriminator network of the DAN to optimize the minimax objective function for the DAN. In an advantageous embodiment, the weights of the estimator network and the discriminator network are iteratively updated to optimize the minimax function of Equation (6). The weights of the estimator network and the discriminator network can be initialized using randomized weights, weights from other estimator and/or discriminator networks trained for other medical image analysis tasks, or any other default initial values. It is to be understood that, although step 504 is performed before step 506 in the method of FIG. 5, the order of these steps can be reversed.

At step 504, with the weights of the estimator fixed, weights of the discriminator are learned to optimize the minimax objective function. In particular, as described above, the weights of the discriminator are adjusted to maximize the probability scores computed by the discriminator for the ground truth models and to minimize the probability scores computed by the discriminator for the estimated models estimated by the estimator from the input images over the set of training samples.

At step 506, with the weights of the discriminator fixed, weights of the estimator are learned to optimize the minimax objective function. In particular, as described above, the weights of the estimator are adjusted to minimize the cost function error calculated between the ground truth output models and output models estimated by the estimator and to maximize the probability scores computed by the discriminator for the estimated models estimated by the estimator over the set of training samples.

At step 508, it is determined whether a stop condition has been reached. If the stop condition has not yet been reached, the method returns to step 504. If the stop condition has been reached, the method proceeds to step 510. In an advantageous implementation, the stop condition is convergence of the weights of the estimator and the discriminator. In this case, steps 504 and 506 are repeated until the weights of the estimator and the discriminator converge. The stop condition could also be met when a predetermined maximum number of iterations has been reached.

At step 510, once the stop condition is reached, the training ends. The trained estimator is stored in a memory or storage of a computer system and then used in the inference stage to estimate a model providing results of the target medical image analysis task for each newly received medical image input to the trained estimator. The trained discriminator can be stored in a memory or storage of a computer system as well. The trained discriminator can be used to evaluate the model estimated by the trained estimator in the inference stage to provide a confidence value for the estimated model.

Returning to FIG. 2, in the inference stage, at step 202, a medical image a patient is received. The medical image can be a 2D or 3D medical image acquired using any type of medical imaging modality, such as CT, MR, DynaCT, ultrasound, PET, etc. Depending on the target medical imaging task to be performed for the received input medical image, the input medical image may be a set of medical images. The input medical image may be received directly from an image acquisition device used to acquire the input medical image, such as a CT scanner, MR scanner, etc. Alternatively, the input medical image may be received by loading a previously acquired medical image from a storage or memory of a computer system or receiving a medical image that has been transmitted from a remote computer system.

At step 204, a model providing a result of the target medical image analysis task for the received medical image is estimated from the received medical image using the estimator of the trained DAN. In particular, the received medical image I is input to the trained estimator $E_\alpha$, and the trained estimator $E_\alpha$ estimates the estimated output model $\pi=E_\alpha(I)$ for the medical image I. The estimated output model $\pi$ provides the result of the target medical image analysis task for the received medical image. For example, for the medical image analysis task of landmark detection, the estimated model can provide the pixel/voxel location of a target landmark in the medical image (or pixel/voxel locations for a set of target landmarks). For anatomical object (e.g., organ) detection, the estimated model can define a bounding box that surrounds the target anatomical object. For medical imaging analysis tasks the estimated model output by the estimator may be an image, such as a segmentation mask for image segmentation, a deformation field for image registration, a denoised image for image denoising, or a synthesized medical image for cross-modality image synthesis.

At step 206, the estimated model providing the result of the target medical image analysis task for the received medical image is output. The estimated model can be output by displaying the estimated model on a display device of a computer system. For example, in cases in which the estimated model is an image, such as a segmentation mask for image segmentation, a deformation field for image registration, a denoised image for image denoising, or a synthesized medical image for cross-modality image synthesis, the image providing the result of the medical image analysis task can be displayed on the display device. In cases in which the estimated model is not an image, the estimated model can be displayed together with the original received medical image on the display device. For example, if the estimated model provides one or more pixel/voxel locations of target landmarks in the received medical image, the received medical image can be displayed and the pixel/voxel locations of the target landmarks can be highlighted on the medical image or pointers can be overlaid in the medical image indicating the locations of the target landmarks. If the estimated model defines a bounding box for anatomical object localization, the bounding box can be displayed on the received medical image.

In addition, the estimated model providing the result of the target medical image analysis task can be input to the discriminator network trained in the DAN in order to computer a confidence score the for estimated model.

Deep Image-to-Image Dual Inverse Network Learning

Medical images can be acquired by different types of image acquisition devices, such as ultrasound, computed tomography, and magnetic resonance image acquisition devices. Generally speaking, analysis of such medical images, which is about extracting knowledge J from image I, can be thought of as invoking a mapping function between the input, which is image I and output, which is knowledge J. The challenge lies in how to learn such a mapping function for efficient and effective medical image analysis. According to an advantageous embodiment of the present invention, a deep image-to-image duel inverse network learning method is described herein that leads to more efficient and effective learning than existing methods for medical image analysis tasks.

Figure 6:
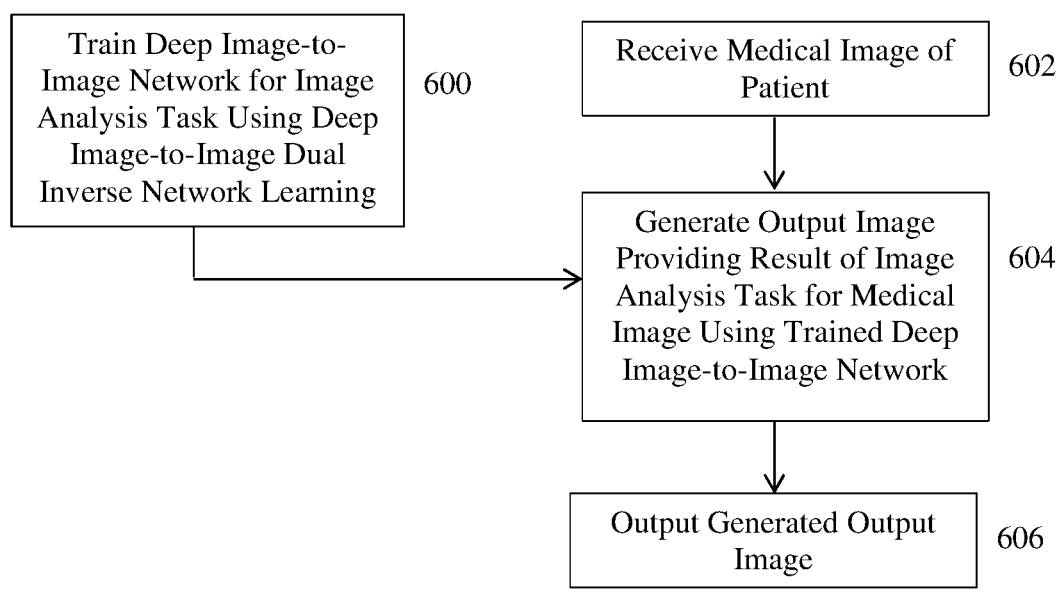
FIG. 6 illustrates a method for performing a target medical image analysis task using deep-image-to-image dual inverse network learning according to an embodiment of the present invention.

FIG. 6 illustrates a method for performing a target medical image analysis task using deep-image-to-image dual inverse network learning according to an embodiment of the present invention. The method of FIG. 6 includes a training stage (step 600) and an inference stage (steps 602-606). The training stage (step 600) is performed off-line to train a deep neural network for a particular medical image analysis task. The inference stage (steps 602-606) performs the medical image analysis task on a newly received medical image using the trained deep neural network resulting from the training stage. Once the deep neural network for a particular medical image analysis task is trained in the training stage, the inference stage can be repeated for each newly received medical image(s) to perform the medical image analysis task on each newly received input medical image(s) using the trained deep neural network. Referring to FIG. 6, at step 600, a deep image-to-image network (DI2IN) is trained for a target medical image analysis task using deep image-to-image dual inverse network learning.

A family of model estimation tasks can be formulated within a deep image-to-image network (DI2IN) learning framework, which is fully convolutional. In a DI2IN, the input is an image (or multiple images) and the output is also an image of the same grid size that represents the result of the target medical image analysis task. This framework can be applied to perform many medical image analysis tasks. For example, for landmark detection, an image with a Gaussian blob around the target landmark can be used to represent a landmark. For image segmentation, the mask image is already in the image representation format. As described in U.S. Pat. No. 9,760,807, entitled "Deep Image-to-Image Network Learning for Medical Image Analysis," which is incorporated herein in its entirety by reference, various medical image analysis tasks such as detection, segmentation, registration, denoising, and cross-modality synthesis can be formulated in a DI2IN framework.

Figure 7:
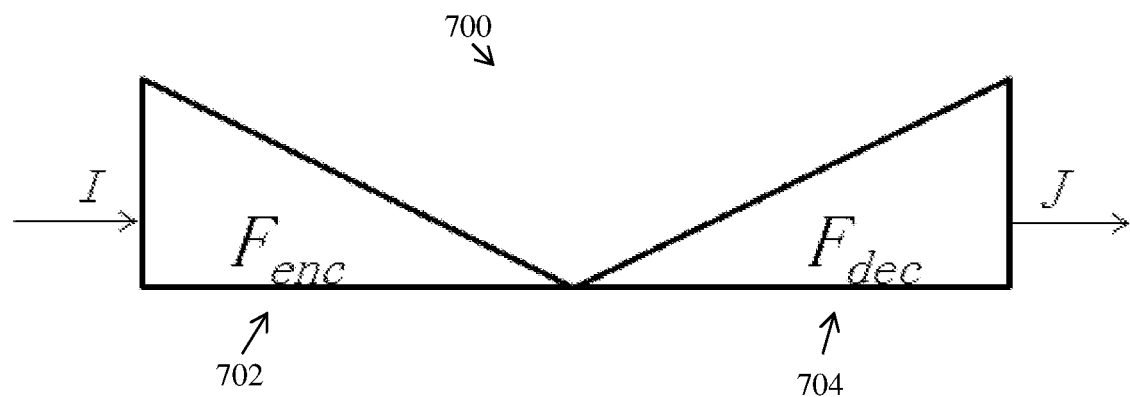
FIG. 7 illustrates a deep image-to-image network (DI2IN) for medical image analysis according to an embodiment of the present invention.

FIG. 7 illustrates a deep image-to-image network (DI2IN) 700 for medical image analysis according to an embodiment of the present invention. As shown in FIG. 7, the DI2IN 700 inputs and input image I and outputs an output image J. The DI2IN 700 includes an encoding network (or encoder) $F_{enc}$ 702, which depicts the input image I from low-level to high-level representations, and a decoding network $F_{dec}$ 704, which converts the high-level representation back to a pixel-level semantic representation to generate the output image J. This can be expressed as:

$$J = F_{dec}(F_{enc}(I)). \tag{10}$$

The encoder $F_{enc}$ 702 of the DI2IN 700 has a series of layers that code the input image I into a code whose size is substantially less than the size of the input image I. The decoder $F_{dec}$ 704 of the DI2IN 700 has a series of layers that will then decode the code into the output image J. All the intermediate information generated in the encoder $F_{enc}$ 702 is shared with the decoder $F_{dec}$ 704, so that no information is lost in the encoding process.

Figure 8:
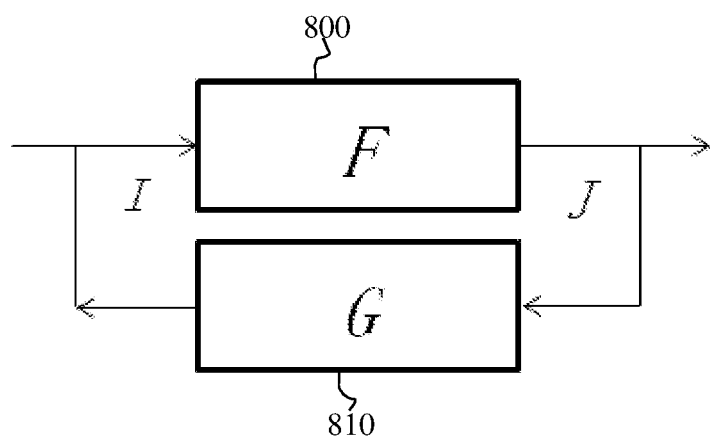
FIG. 8 illustrates a dual inversion network (DIN) according to an embodiment of the present invention.

According to an advantageous embodiment, a dual inversion network (DIN) learning framework is used in training. FIG. 8 illustrates a dual inversion network (DIN) according to an embodiment of the present invention. As shown in FIG. 8, in a DIN, two networks F 800 and G 810 are learned together instead of a single network, with the network F 800 performing the medical image analysis task and the dual network G 810 being the inverse of the network F:

$$J = F(I); \tag{11}$$

$$I = G(J). \tag{12}$$

The use of the DIN introduces the following identify constraints that can be used to induce better learning:

$$I = G(F(I)); \tag{13}$$

$$J = F(G(J)). \tag{14}$$

In addition, the DIN learning simultaneously solves to problems within one learning framework at the cost of more computation.

Figure 9:
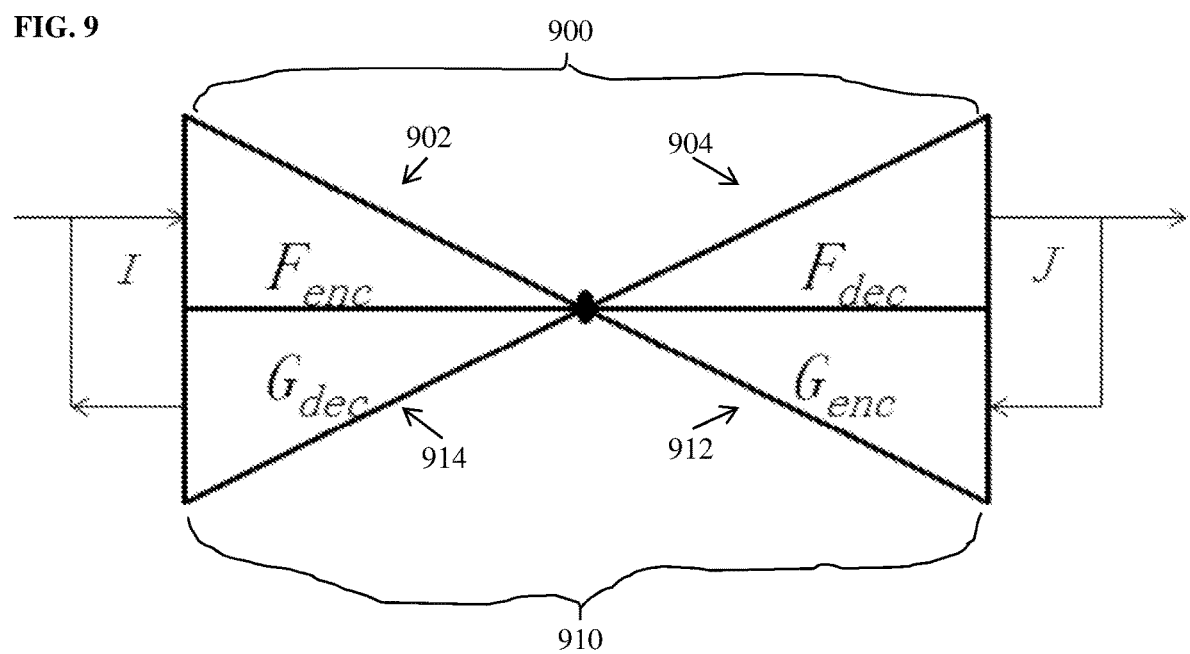
FIG. 9 illustrates a deep image-to-image dual inverse network according to an embodiment of the present invention.

In and advantageous embodiment of the present invention, deep image-to-image dual inverse network learning integrates deep image-to-image network (DI2IN) learning and dual inverse network (DIN) learning into a single learning framework. FIG. 9 illustrates a deep image-to-image dual inverse network according to an embodiment of the present invention. As shown in FIG. 9, the deep image-to-image dual inverse network includes a first DI2IN F 900 and a second DI2IN G 910. The first DI2IN F 900 inputs a medical image I and outputs an output image J providing the result of a target medical image analysis task. The first DI2IN F 900 includes an encoder $F_{enc}$ 902 that converts the input medical image I to a high-level feature representation (feature map) and a decoder $F_{dec}$ 904 that converts the feature map output by the encoder $F_{enc}$ 902 to the output image J. The second DI2IN G 910 is an inverse network of the first DI2IN F 900. The second DI2IN G 910 inputs image J and outputs image I. The second DI2IN G 910 includes an encoder $G_{enc}$ 912 that converts image J to a high-level feature representation (feature map) and a decoder $G_{dec}$ 914 that converts the feature map output by the encoder $G_{enc}$ 912 to reproduce image I.

The generation of the output image J by the first DI2IN F 900 from the input image I and the reproduction of the original input image I by the second DI2IN G 910 from image J can be expressed as:

$$J = F_{dec}(F_{enc}(I)); \tag{15}$$

$$I = G_{dec}(G_{enc}(J)). \tag{16}$$

For the deep image-to-image dual inverse network, the identity constraints now become:

$$G_{dec}(G_{enc}(F_{dec}(F_{enc}(I)))) = I; \tag{17}$$

$$F_{dec}(F_{enc}(G_{dec}(G_{enc}(J)))) = J. \tag{18}$$

According to an advantageous embodiment of the present invention, an additional constraint, referring herein as the "bridging constraint", is introduced:

$$F_{enc}(I) = G_{enc}(J); \tag{19}$$

This bridging constraint, when enforced during training, essentially brings the feature representations generated from I (by $F_{enc}$ 902) and J (by $G_{enc}$ 912) together to the same "bridging" feature representation.

With the newly introduced bridging constraint of Equation (19), the architecture of the deep image-to-image dual inversion network now contains two auto-encoder-decoders, that is:

$$G_{dec}(F_{enc}(I)) = I; \tag{20}$$

$$F_{dec}(G_{enc}(J)) = J. \tag{21}$$

This can be verified as:

$$G_{dec}(F_{enc}(I)) = G_{dec}(G_{enc}(I)) = I; \tag{22}$$

$$F_{dec}(G_{enc}(J)) = F_{dec}(F_{enc}(I)) = J. \tag{23}$$

Further, with the newly introduced bridging constraint of Equation (19) enforced, the identity constraints in Equations (17) and (18) hold automatically. This can be verified as:

$$\begin{aligned}G_{dec}(G_{enc}(F_{dec}(F_{enc}(I)))) &= G_{dec}(G_{enc}(F_{dec}(G_{enc}(J)))) = \\ G_{dec}(G_{enc}(J)) &= I;\end{aligned} \tag{24}$$

$$\begin{aligned}F_{dec}(F_{enc}(G_{dec}(G_{enc}(I)))) &= F_{dec}(F_{enc}(G_{dec}(F_{enc}(I)))) = \\ F_{dec}(F_{enc}(I)) &= J.\end{aligned} \tag{25}$$

Accordingly, by enforcing the bridging constraint, the identity constraints are automatically satisfied as well. Thus, in an advantageous implementation, the training utilizes the bridging constraint and incorporates the bridging constraint as part of the learning criteria for learning the weights of the first DI2IN F 900 and the second DI2IN G 910.

Given a set of N training pairs $\{(I_n, J_n), n=1, 2, \ldots, N\}$, the task in training is to learn network parameters (weights) for $F_{enc}$ 902, $F_{dec}$ 904, $G_{enc}$ 912, and $G_{dec}$ 914 that yield the solution that minimizes the following cost function:

$$\min_{F_{enc}, F_{dec}, G_{enc}, G_{dec}} \frac{1}{N} \sum_n L_1(J_n, F_{dec}(F_{enc}(I_n))) + \frac{1}{N} \sum_n L_2(I_n, G_{dec}(G_{enc}(J_n))) + \frac{1}{N} \sum_n L_3(F_{enc}(I_n), G_{enc}(J_n)), \tag{26}$$

in which $L_1$, $L_2$, and $L_3$ are corresponding loss functions. In the cost function of Equation (26), the first term is a loss function $L_1$ that calculates an error between the ground truth output image $J_n$ and the output image generated by the first DI2IN F 900 over the set of training samples. The second term of the cost function is a loss function $L_2$ that calculates an error between the original input image I and a reproduced input image generated by the second DI2IN G 910 from the ground truth output image $J_n$ over the set of training samples. The third term of the cost function incorporates the bridging constraint into the learning framework. In particular, the third term of the cost function is a loss function $L_e$ that calculates an error between the feature representation of $I_n$ generated by the encoder $F_{enc}$ 902 of the first DI2IN 900 and the feature representation of $J_n$ generated by the encoder $G_{enc}$ 912 of the second DI2IN 910 over the set of training samples.

In an advantageous implementation, the minimization of the cost function of Equation (26) is achieved by iteratively alternating the following two steps until the parameters (weights) of $F_{enc}$ 902, $F_{dec}$ 904, $G_{enc}$ 912, and $G_{dec}$ 914 converge (or until a preset maximum number of training iterations is reached:

Step 1—With $G_{enc}$ 912, and $G_{dec}$ 914 fixed, solve the following minimization task for $F_{enc}$ 902 and $F_{dec}$ 904:

$$\min_{F_{enc},F_{dec}} \frac{1}{N}\sum_n L_1(J_n, F_{dec}(F_{enc}(I_n))) + \frac{1}{N}\sum_n L_3(F_{enc}(I_n), G_{enc}(J_n)).$$

In this step, parameters (weights) are learned for the encoder $F_{enc}$ 902 and decoder $F_{dec}$ 904 of the first DI2IN 900 to minimize the loss due to the error between the ground truth output image and the output image generated by the first DI2IN 900 and the loss due to error between the feature representation of the input image generated by the encoder $F_{enc}$ 902 of the first DI2IN 900 and the feature representation of the ground truth output image generated by the encoder $G_{enc}$ 912 of the second DI2IN 910 over the set of training samples. This minimization task can be performed using a backpropagation step implemented based on a minibatch of training pairs.

Step 2—With $F_{enc}$ 902, and $F_{dec}$ 904 fixed, solve the following minimization task for $G_{enc}$ 912 and $G_{dec}$ 914:

$$\min_{G_{enc},G_{dec}} \frac{1}{N}\sum_n L_2(I_n, G_{dec}(G_{enc}(J_n))) + \frac{1}{N}\sum_n L_3(F_{enc}(I_n), G_{enc}(J_n)).$$

In this step, parameters (weights) are learned for the encoder $G_{enc}$ 912 and decoder $G_{dec}$ 914 of the second DI2IN 910 to minimize the loss due to the error between the original input image and the reproduced input image generated by the second DI2IN 910 and the loss due to error between the feature representation of the input image generated by the encoder $F_{en}$, 902 of the first DI2IN 900 and the feature representation of the ground truth output image generated by the encoder $G_{enc}$ 912 of the second DI2IN 910 over the set of training samples. This minimization task can be performed using a backpropagation step implemented based on a minibatch of training pairs.

Figure 10:
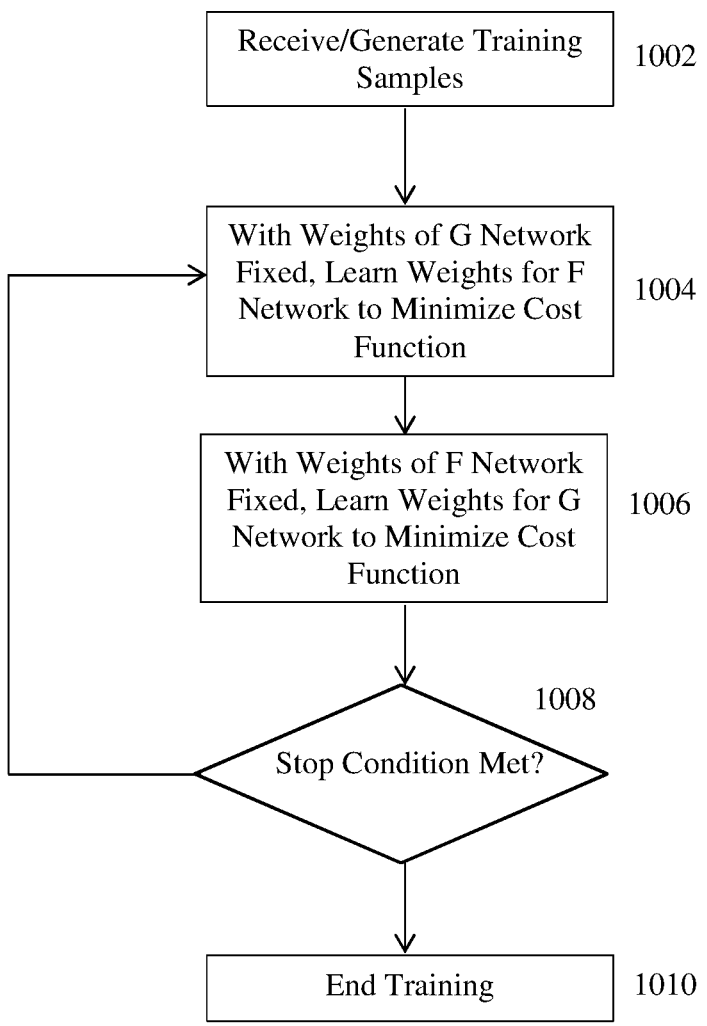
FIG. 10 illustrates a method for training a deep image-to-image network for performing a medical image analysis task in a deep image-to-image dual inverse network according to an embodiment of the present invention.

FIG. 10 illustrates a method for training a deep image-to-image network for performing a medical image analysis task in a deep image-to-image dual inverse network according to an embodiment of the present invention. At step 1002, training samples are received and/or generated. The training samples include a set of N training pairs $\{(I_n, J_n), n=1, 2, \ldots, N\}$. Each training pair includes a ground truth input medical image $I_n$ (or multiple input medical images, e.g., if the target medical image analysis task is registration) and a corresponding ground truth output image $I_n$ that provides the results of the target medical image analysis task for the input medical image $I_n$.

The DI2IN framework can be used to formulate many different medical image analysis problems. In order to use the DI2IN framework to perform a particular medical image analysis task, an output image must be defined that provides the result of that medical image analysis task. For the medical image analysis task of landmark detection, the output image can be an image with a Gaussian-like blob surrounding each landmark. For anatomical object (e.g., organ) detection, the output image can be a binary mask with pixels (or voxels) equal to 1 within a bounding box surrounding the target anatomical object and equal 0 at all other pixel locations. For image segmentation, the output image can be a mask image whose value is 1 inside the segmented object boundary and 0 outside the segmented object boundary. For image registration, the output image can be a deformation field. For image denoising, the output image is a denoised image. For cross-modality image synthesis, the input image is a medical image of one imaging modality and the output image is a synthesized medical image of a different imaging modality.

The ground truth input images are medical images acquired using any type of medical imaging modality, such as computed tomography (CT), magnetic resonance (MR), DynaCT, ultrasound, x-ray, positron emission tomography (PET), etc., depending on the target medical image analysis task for which the DAN is to be trained. The ground truth input images can be received by loading a number of previously stored medical images from a database of medical images. In some embodiments, the ground truth output images corresponding to the ground truth input images may be existing images that are stored in a database. In this case, the ground truth output images are received by loading the previously stored ground truth output image corresponding to each ground truth input image. In other embodiments, ground truth output images can be generated automatically or semi-automatically from the received ground truth input images by converting manual annotations or existing results of the target medical image analysis task to the output images defined for the target medical image analysis task.

Steps 1004-1008 of the FIG. 10 iteratively update weights of a first DI2IN (F network) that generates a predicted output image from each ground truth input image and a second DI2IN (G network) that is an inverse of the first DI2IN and generates a predicted input image from each ground truth output image to minimize a cost function. In an advantageous embodiment, the weights of the first and second DI2INs are iteratively updated to optimize the cost function of Equation (26). The weights of the encoder $F_{enc}$ and the decoder $F_{dec}$ of the F network and the encoder $G_{enc}$ and the decoder $G_{dec}$ of the G network can be initialized using randomized weights, weights from other deep image-to-image networks trained for other medical image analysis tasks, or any other default initial values. It is to be understood that, although step 1004 is performed before step 1006 in the method of FIG. 10, the order of these steps can be reversed.

At step 1004, with the weights of the G network fixed, weights of the F network are learned to minimize the cost function. In particular, as described above, the weights of the encoder $F_{enc}$ and the decoder $F_{dec}$ of the F network are adjusted to minimize the loss due to the error between the ground truth output images and the predicted output images generated by the F network and the loss due to error between the feature representations of the ground input images generated by the encoder $F_{enc}$ of the F network and the feature representations of the ground truth output images generated by the encoder $G_{enc}$ of the G network over the set of training samples.

At step 1006, with the weights of the F network fixed, weights of the G network are learned to minimize the cost function. In particular, as described above, the weights of the encoder $G_{enc}$ and the decoder $G_{dec}$ of the G network are adjusted to minimize the loss due to the error between the ground truth input images and the predicted input images generated by the G network and the loss due to error between the feature representations of the ground input images generated by the encoder $F_{enc}$ of the F network and the feature representations of the ground truth output images generated by the encoder $G_{enc}$ of the G network over the set of training samples.

At step 1008, it is determined whether a stop condition has been reached. If the stop condition has not yet been reached, the method returns to step 1004. If the stop condition has been reached, the method proceeds to step 1010. In an advantageous implementation, the stop condition is convergence of the weights of the F network and the G network. In this case, steps 1004 and 1006 are repeated until the weights of the F network and the G network converge. The stop condition could also be met when a predetermined maximum number of iterations has been reached.

At step 1010, once the stop condition is reached, the training ends. The trained F network (i.e., the first DI2IN) is stored in a memory or storage of a computer system and then used in the inference stage to generate an output image providing a result of the target medical image analysis task for each newly received medical image input to the trained F network. In some embodiments, the trained G network can be stored in a memory or storage of a computer system as well. Depending on the target medical image analysis task, the trained G network may be used in inference to perform an inverse task to the target medical image analysis task. For example, in a case in which the target medical image analysis task for which the F network is trained is synthesizing a medical image of a second modality from an input medical image of a first modality, the trained G network can be used to synthesize a medical image of the first modality from an input medical image of the second modality.

Returning to FIG. 6, in the inference stage, at step 602, a medical image a patient is received. The medical image can be a 2D or 3D medical image acquired using any type of medical imaging modality, such as CT, MR, DynaCT, ultrasound, PET, etc. Depending on the target medical imaging task to be performed for the received input medical image, the input medical image may be a set of medical images. The input medical image may be received directly from an image acquisition device used to acquire the input medical image, such as a CT scanner, MR scanner, etc. Alternatively, the input medical image may be received by loading a previously acquired medical image from a storage or memory of a computer system or receiving a medical image that has been transmitted from a remote computer system.

At step 604, an output image that provides a result of a medical image analysis task is generated from the input image using the DI2IN trained to perform the medical image analysis task in the deep image-to-image dual inverse network. The trained DI2IN includes a trained encoder network that coverts the input medical image to a high-level feature representation and a decoder network that generates the output image providing the result of the target image analysis task from the feature representation generated by the encoder network. As described above, the type of output image generated by the trained DI2IN depends on the target medical image task. For example, an image with a Gaussian-like blob surrounding detected landmarks can be generated to provide the results of a landmark detection task. A mask image can be generated to provide the results of an anatomical object detection or segmentation task. A denoised medical image can be generated to provide the result of an image denoising task. A synthesized target domain medical image may be generated based on an input source domain medical image to provide the result on a cross-domain image synthesis task. A deformation field may be generated to provide the result for an image registration task between a pair of input medical images.

At step 606, the generated output image, which provides the result of the target medical image analysis task for the input image, is output. For example, the generated output image can be output by displaying the generated output image on a display device of a computer system. The generated output image can also be output by storing the generated output image on a memory or storage of a computer system or by transmitting the generated output image to a remote computer system.

Figure 11:
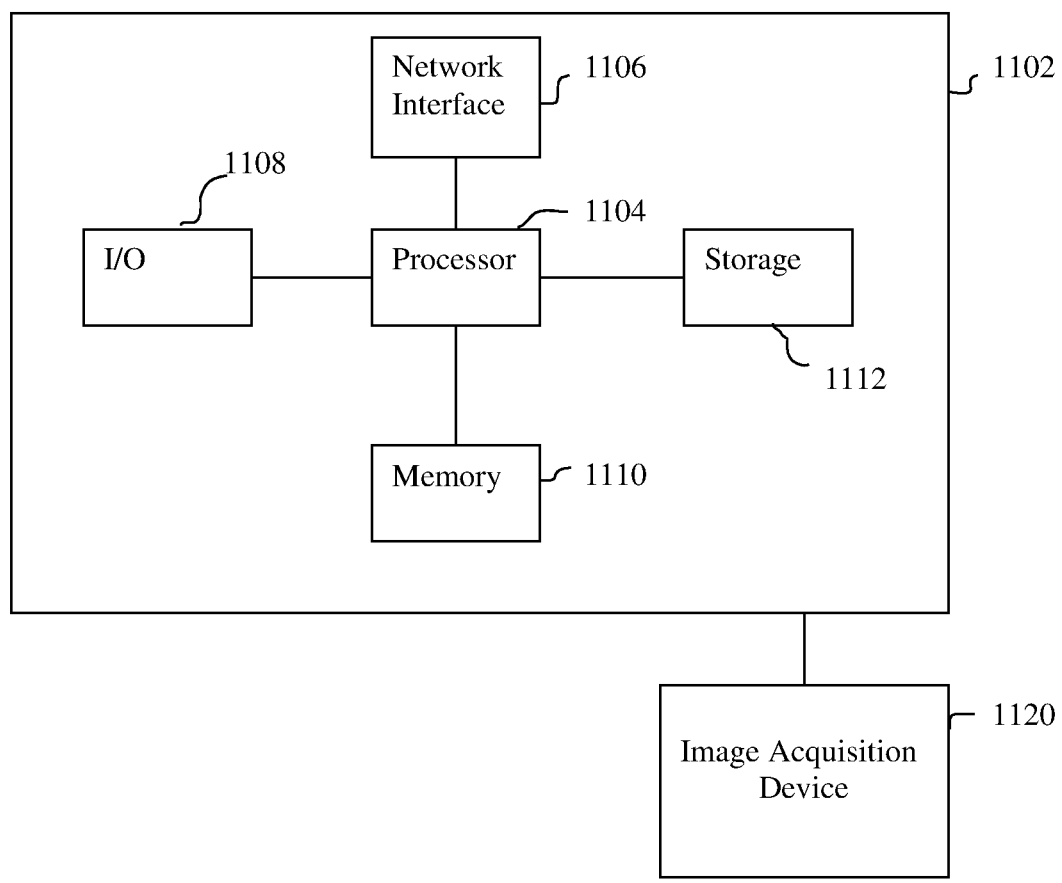
FIG. 11 is a high-level block diagram of a computer capable of implementing the present invention.

The above-described methods for performing medical image analysis tasks using trained deep neural networks and for training deep neural networks to perform medical image analysis tasks may be implemented on a computer using well-known computer processors, memory units, storage devices, computer software, and other components. A high-level block diagram of such a computer is illustrated in FIG. 11. Computer 1102 contains a processor 1104, which controls the overall operation of the computer 1102 by executing computer program instructions which define such operation. The computer program instructions may be stored in a storage device 1112 (e.g., magnetic disk) and loaded into memory 1110 when execution of the computer program instructions is desired. Thus, the steps of the methods of FIGS. 2, 5, 6, and 10 may be defined by the computer program instructions stored in the memory 1110 and/or storage 1112 and controlled by the processor 1104 executing the computer program instructions. An image acquisition device 1120, such as an MRI scanner, can be connected to the computer 1102 to input image data to the computer 1102. It is possible to implement the image acquisition device 1120 and the computer 1102 as one device. It is also possible that the image acquisition device 1120 and the computer 1102 communicate wirelessly through a network. In a possible embodiment, the computer 1102 can be located remotely with respect to the image acquisition device 1120 and the method steps described herein can be performed as part of a server or cloud based service. In this case, the method steps may be performed on a single computer or distributed between multiple networked computers. The computer 1102 also includes one or more network interfaces 1106 for communicating with other devices via a network. The computer 1102 also includes other input/output devices 808 that enable user interaction with the computer 1102 (e.g., display, keyboard, mouse, speakers, buttons, etc.). Such input/output devices 1108 may be used in conjunction with a set of computer programs as an annotation tool to annotate images/volumes received from the image acquisition device 1120. One skilled in the art will recognize that an implementation of an actual computer could contain other components as well, and that FIG. 11 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for automatically performing a medical image analysis task on a medical image of a patient, comprising:
    receiving a medical image of a patient;
    inputting the medical image to a trained deep neural network; and
    automatically estimating an output model that provides a result of a target medical image analysis task on the input medical image using the trained deep neural network, wherein the trained deep neural network is trained in a discriminative adversarial network based on a minimax objective function comprising 1) a first cost term related to classification, by a discriminator network of the discriminative adversarial network, of ground truth output models, 2) a second cost term related to classification, by the discriminator network, of estimated output models estimated by an estimator network of the discriminative adversarial network from input training images, and 3) a third cost term computed using a cost function that calculates an error between the ground truth output models and the estimated output models.

2. The method of claim 1, wherein the trained deep neural network is the estimator network that directly maps the output model from the input medical image.

3. The method of claim 2, wherein the estimator network and the discriminator network of the discriminative adversarial network are trained together based on a set of training samples including the input training images and the ground truth output models to learn parameters for the estimator network and the discriminator network that optimize the minimax objective function over the set of training samples.

4. The method of claim 1, further comprising:
    training the estimator network and the discriminator network to learn parameters to optimize the minimax objective function by repeating the following training operations for a plurality of iterations:
        with the parameters of the estimator network fixed, learning the parameters of the discriminator network to optimize the minimax objective function; and
        with the parameters of the discriminator network fixed, learning the parameters of the estimator network to optimize the minimax objective function.

5. The method of claim 4, wherein:
    learning the parameters of the discriminator network to optimize the minimax objective function comprises adjusting the parameters of the discriminator network to maximize probability scores computed by the discriminator network for the ground truth output models and to minimize probability scores computed by the discriminator for the estimated output models estimated by the estimator network from the input training images over a set of training samples; and
    learning the parameters of the estimator network to optimize the minimax objective function comprises adjusting the parameters of the estimator network to minimize the error between the ground truth output models and the estimated output models estimated by the estimator network and to maximize the probability scores computed by the discriminator for the estimated models estimated by the estimator network over the set of training samples.

6. An apparatus for automatically performing a medical image analysis task on a medical image of a patient, comprising:
    means for receiving a medical image of a patient;
    means for inputting the medical image to a trained deep neural network; and
    means for automatically estimating an output model that provides a result of a target medical image analysis task on the input medical image using the trained deep neural network, wherein the trained deep neural network is trained in a discriminative adversarial network based on a minimax objective function comprising 1) a first cost term related to classification, by a discriminator network of the discriminative adversarial network, of ground truth output models, 2) a second cost term related to classification, by the discriminator network, of estimated output models estimated by an estimator network of the discriminative adversarial network from input training images, and 3) a third cost term computed using a cost function that calculates an error between the ground truth output models and the estimated output models.

7. The apparatus of claim 6, wherein the trained deep neural network is the estimator network that directly maps the output model from the input medical image.

8. The apparatus of claim 7, wherein the estimator network and the discriminator network of the discriminative adversarial network are trained together based on a set of training samples including the input training images and the ground truth output models to learn parameters for the estimator network and the discriminator network that optimize the minimax objective function over the set of training samples.

9. The apparatus of claim 6, further comprising:
    training the estimator network and the discriminator network to learn parameters to optimize the minimax objective function by repeating the following training operations for a plurality of iterations:
        with the parameters of the estimator network fixed, learning the parameters of the discriminator network to optimize the minimax objective function; and
        with the parameters of the discriminator network fixed, learning the parameters of the estimator network to optimize the minimax objective function.

10. The apparatus of claim 9, wherein:
    learning the parameters of the discriminator network to optimize the minimax objective function comprises adjusting the parameters of the discriminator network to maximize probability scores computed by the discriminator network for the ground truth output models and to minimize probability scores computed by the discriminator for the estimated output models estimated by the estimator network from the input training images over a set of training samples; and
    learning the parameters of the estimator network to optimize the minimax objective function comprises adjusting the parameters of the estimator network to minimize the error between the ground truth output models and the estimated output models estimated by the estimator network and to maximize the probability scores computed by the discriminator for the estimated models estimated by the estimator network over the set of training samples.

11. A non-transitory computer readable medium storing computer program instructions for automatically performing a medical image analysis task on a medical image of a patient, the computer program instructions when executed by a processor cause the processor to perform operations comprising:
  receiving a medical image of a patient;
  inputting the medical image to a trained deep neural network; and
  automatically estimating an output model that provides a result of a target medical image analysis task on the input medical image using the trained deep neural network, wherein the trained deep neural network is trained in a discriminative adversarial network based on a minimax objective function comprising 1) a first cost term related to classification, by a discriminator network of the discriminative adversarial network, of ground truth output models, 2) a second cost term related to classification, by the discriminator network, of estimated output models estimated by an estimator network of the discriminative adversarial network from input training images, and 3) a third cost term computed using a cost function that calculates an error between the ground truth output models and the estimated output models.

12. The non-transitory computer readable medium of claim 11, wherein the trained deep neural network is the estimator network that directly maps the output model from the input medical image.

13. The non-transitory computer readable medium of claim 12, wherein the estimator network and the discriminator network of the discriminative adversarial network are trained together based on a set of training samples including the input training images and the ground truth output models to learn parameters for the estimator network and the discriminator network that optimize the minimax objective function over the set of training samples.

14. The non-transitory computer readable medium of claim 11, wherein the operations further comprise:
  training the estimator network and the discriminator network to learn parameters to optimize the minimax objective function by repeating the following training operations for a plurality of iterations:
    with the parameters of the estimator network fixed, learning the parameters of the discriminator network to optimize the minimax objective function; and
    with the parameters of the discriminator network fixed, learning the parameters of the estimator network to optimize the minimax objective function.

15. The non-transitory computer readable medium of claim 14, wherein:
  learning the parameters of the discriminator network to optimize the minimax objective function comprises adjusting the parameters of the discriminator network to maximize probability scores computed by the discriminator network for the ground truth output models and to minimize probability scores computed by the discriminator for the estimated output models estimated by the estimator network from the input training images over a set of training samples; and
  learning the parameters of the estimator network to optimize the minimax objective function comprises adjusting the parameters of the estimator network to minimize the error between the ground truth output models and the estimated output models estimated by the estimator network and to maximize the probability scores computed by the discriminator for the estimated models estimated by the estimator network over the set of training samples.

* * * * *